United States Patent
Byun et al.

(10) Patent No.: US 8,236,439 B2
(45) Date of Patent: Aug. 7, 2012

(54) RECHARGEABLE BATTERY

(75) Inventors: Sang-Won Byun, Yongin-si (KR);
Yong-Sam Kim, Yongin-si (KR);
Hyo-Seob Kim, Yongin-si (KR)

(73) Assignee: SB LiMotive Co., Ltd., Yongin-si (KR)

( * ) Notice: Subject to any disclaimer, the term of this patent is extended or adjusted under 35 U.S.C. 154(b) by 73 days.

(21) Appl. No.: 12/832,023

(22) Filed: Jul. 7, 2010

(65) Prior Publication Data

US 2011/0039136 A1 Feb. 17, 2011

Related U.S. Application Data

(60) Provisional application No. 61/234,117, filed on Aug. 14, 2009.

(51) Int. Cl.
*H01M 10/34* (2006.01)
*H01M 10/52* (2006.01)

(52) U.S. Cl. ............... 429/59; 429/53; 429/56; 429/57; 429/60

(58) Field of Classification Search ............ 429/57, 429/58, 53–56, 61, 59
See application file for complete search history.

(56) References Cited

U.S. PATENT DOCUMENTS

| | | | |
|---|---|---|---|
| 5,523,178 A | 6/1996 | Murakami et al. | |
| 5,707,756 A * | 1/1998 | Inoue et al. | 429/57 |
| 2007/0166605 A1 * | 7/2007 | Meguro et al. | 429/61 |
| 2011/0135976 A1 * | 6/2011 | Byun | 429/56 |

FOREIGN PATENT DOCUMENTS

| | | |
|---|---|---|
| EP | 1 076 350 A2 | 2/2001 |
| JP | 06-290767 | 10/1994 |
| JP | 09-106804 | 4/1997 |
| JP | 10-326610 | 12/1998 |
| JP | 11-007931 | 1/1999 |
| JP | 3232767 | 9/2001 |

OTHER PUBLICATIONS

Patent Abstract of Japan for Publication No. 06-290767 dated Oct. 18, 1994 corresponding to Japanese Patent No. 3232767 referenced above.

Patent Abstracts of Japan and English machine translation for publication No. JP 10-326610, dated Dec. 8, 1998 in the name of Kobayashi.

(Continued)

*Primary Examiner* — Jennifer Michener
*Assistant Examiner* — Heng Chan
(74) *Attorney, Agent, or Firm* — Christie, Parker & Hale, LLP

(57) ABSTRACT

A rechargeable battery according to an exemplary embodiment of the present invention includes an electrode assembly, a case containing the electrode assembly, and a cap assembly. The electrode assembly includes a first electrode, a second electrode, and a separator between the first and second electrodes. The cap assembly is coupled to the case. The cap assembly includes a tab that is electrically connected to the first electrode and a deformable plate that is electrically connected to the second electrode. The deformable plate also includes a notch that is opened due to an increase of pressure. The deformable plate deforms as a result of increased pressure and electrically contacts the first tab, short circuiting the rechargeable battery.

17 Claims, 9 Drawing Sheets

OTHER PUBLICATIONS

Patent Abstracts of Japan and English machine translation for publication No. JP 11-007931, dated Jan. 12, 1999 in the name of Kobayashi.

Extended European Search Report dated Oct. 13, 2010 in corresponding European application No. 10169791, listing the cited references in this IDS.

European Search Report dated Apr. 21, 2011, for corresponding European Patent application 10169791.0, noting listed reference in this IDS, as well as references previously submitted in an IDS dated Nov. 24, 2010.

KIPO Office action dated Jan. 17, 2012, for corresponding Korean Patent application 10-2010-0068019, 9 pages, Not in English. Acknowledged.

Patent Abstracts of Japan and English machine translation for Japanese Publication 06-290767 listed above, 13 pages.

* cited by examiner

RECHARGEABLE BATTERY

CROSS-REFERENCE TO RELATED APPLICATIONS

This application claims priority to and the benefit of U.S. Provisional Application No. 61/234,117, filed on Aug. 14, 2009, in the United States Patent and Trademark Office, the entire content of which is incorporated herein by reference.

BACKGROUND

1. Field

The following description relates to a rechargeable battery, and more particularly to a rechargeable battery having a safety apparatus that can prevent or reduce the chance of an explosion when a rechargeable battery is overcharged.

2. Description of the Related Art

Unlike a primary battery that is not designed to be recharged, a rechargeable battery can be repeatedly charged and discharged. Low-capacity rechargeable batteries are used for portable compact electronic apparatuses such as mobile phones, notebook computers, and camcorders, and high-capacity rechargeable batteries are widely used as a power source for driving a motor of a hybrid vehicle, etc.

A high-output rechargeable battery using a non-aqueous electrolyte having high energy density has been recently developed. The high-output rechargeable battery is configured to have high capacity by connecting a plurality of rechargeable cells in series so that it can be used for driving a motor for an apparatus requiring a large amount of power, i.e., an electrical vehicle, etc.

One large-capacity rechargeable battery is commonly formed with a plurality of rechargeable batteries coupled in series. The rechargeable battery may, have a cylindrical shape or prismatic shape.

The prismatic rechargeable battery includes an electrode assembly that has a positive electrode and a negative electrode with a separator interposed therebetween, a case having a space for containing the electrode assembly, a cap plate that seals the case and has a terminal hole into which an electrode terminal is inserted, and an electrode terminal that is electrically connected with the electrode assembly and is inserted into the terminal hole of the cap plate, the terminal protruding out of the case.

When excessive heat is generated inside the rechargeable battery or internal pressure is increased due to dissolution of an electrolyte solution, the battery may explode or combust. Particularly, in the case of the prismatic battery, due to the characteristics of its terminal structure, it is difficult to have a structure that cuts off or discharges current when heat and pressure are increased, especially when compared to the cylindrical battery.

The above information disclosed in this Background section is only for enhancement of understanding of the background of the described technology and therefore it may contain information that does not form the prior art that is already known in this country to a person of ordinary skill in the art.

SUMMARY

An aspect of an embodiment of the present invention is directed toward a rechargeable battery having improved safety.

According to an exemplary embodiment of the present invention, a rechargeable battery includes an electrode assembly including a first electrode, a second electrode, and a separator between the first electrode and the second electrode, a case containing the electrode assembly, and a cap assembly coupled to the case. The cap assembly includes a cap plate, a first tab electrically coupled to the first electrode, and a deformable plate including a notch.

The deformable plate may be configured to form an electrical path between the first electrode and the second electrode when deformed. The deformable plate may be configured to deform and be electrically coupled with the first tab in response to an increase in pressure inside the case to electrically couple the first electrode and the second electrode to each other. The deformable plate may be electrically coupled to the cap plate. The deformable plate may be welded to the cap plate.

The cap assembly may further include an insulating member between the first tab and the cap plate for electrically insulating the first tab from the cap plate. The cap assembly may further include a first terminal electrically coupled to the first electrode and mounted on the cap plate, wherein the first tab is electrically connected to the first terminal. The first tab may have an opening through which the first terminal protrudes from an interior to an exterior of the case. The first tab may be fixed to the cap plate by an enlarged head of the first terminal or a nut coupled to the first terminal. The cap plate may have a short circuit opening covered by the deformable plate. The cap assembly may further include an insulating member between the first tab and the cap plate for electrically insulating the first tab from the cap plate, wherein the insulating member includes an opening to accommodate upward deformation of the deformable plate. The first tab may include a protrusion which is at least partially inserted into the short circuit opening.

The second electrode may be electrically coupled to the cap plate. The cap assembly may further include a second terminal, and the second electrode may be electrically coupled to the second terminal.

The deformable plate may be curved to protrude toward an inside of the case. The deformable plate may be configured to break and open at the notch in response to an increase in pressure inside the case.

The first tab may have a vent hole. A diameter of the vent hole may decrease from the interior of the case toward the exterior of the case. The rechargeable battery may further include a middle member between the first tab and the deformable plate, the middle member being attached to the deformable plate.

The rechargeable battery may further include a first terminal, a second terminal, and a second tab, the first tab may be connected to the first terminal and the second tab may be connected to the second terminal. The rechargeable battery may further include a deformable plate configured to deform and electrically contact the first tab and the second tab in response to an increase in pressure inside the case. The cap plate may have a short circuit opening, wherein a first end of the first tab may be connected to the first terminal and a second end of the first tab may be in the short circuit opening and a first end of the second tab may be connected to the second terminal and a second end of the second tab may be in the short circuit opening.

An exemplary embodiment of the present invention includes a rechargeable battery having an electrode assembly comprising a first electrode, a second electrode, and a separator between the first electrode and the second electrode, a case containing the electrode assembly, and a cap assembly coupled to the case. The cap assembly may include a cap plate, a first tab electrically coupled to the first electrode, and a deformable plate configured to deform and break to allow gas to exit the case. The cap plate may include a vent hole configured to allow gas to exit the case when the deformable plate breaks. The deformable plate may include a first portion and a second portion, the second portion being thinner than the first portion.

An exemplary embodiment of the present invention includes a rechargeable battery having an electrode assembly including a first electrode, a second electrode, and a separator between the first electrode and the second electrode, a case containing the electrode assembly, and a cap assembly coupled to the case. The cap assembly may include a cap plate, a first tab electrically coupled to the first electrode, the first tab having an opening and a deformable plate positioned to allow the gas to escape through the opening when the deformable plate is broken.

DESCRIPTION OF REFERENCE NUMERALS INDICATING SOME ELEMENTS IN THE DRAWINGS

Figure 1:
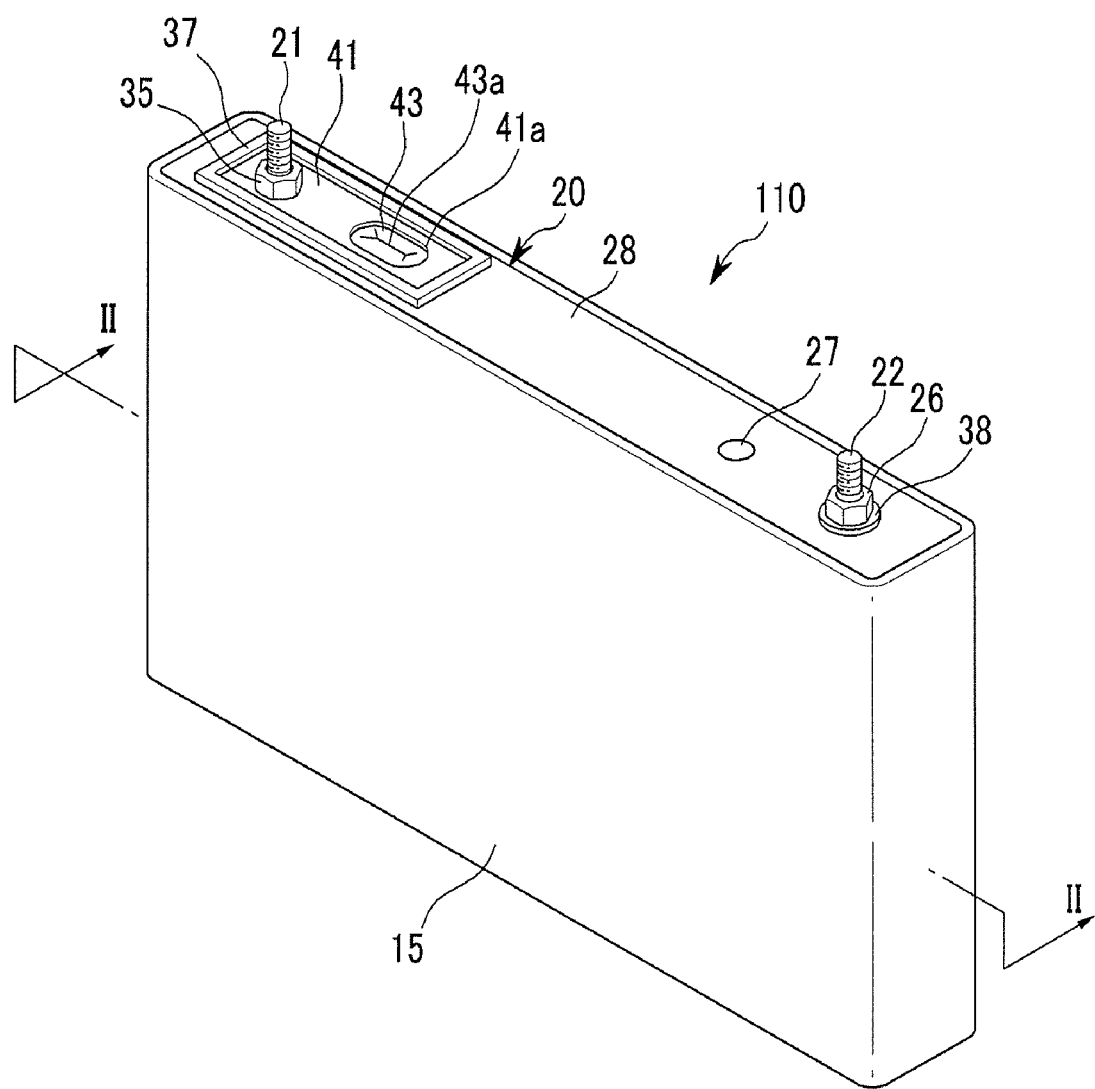
FIG. 1 is a perspective view of a rechargeable battery according to a first exemplary embodiment of the present invention.

| 110: | rechargeable battery |
| --- | --- |
| 10: | electrode assembly |
| 11: | first electrode |
| 12: | second electrode |
| 13: | separator |
| 15: | case |
| 20: | cap assembly |
| 21: | first terminal |
| 22: | second terminal |
| 23: | short circuit opening |
| 28: | cap plate |
| 34: | lower insulation member |
| 35: | nut |

-continued

| 37: | upper insulation member |
| --- | --- |
| 38: | connection tab |
| 41: | first tab |
| 41a: | vent hole |
| 43: | deformable plate |
| 43a: | notch |
| 43b: | frame portion |
| 43c: | deformed portion |
| 45: | middle member |

DETAILED DESCRIPTION

Hereinafter, exemplary embodiments of the present invention will be described in detail with reference to the accompanying drawings such that those having ordinary skill in the art to which the present invention pertains may easily implement the technological concept of the present invention. However, the present invention may be implemented in various different ways, and is not limited to the following exemplary embodiments. Like reference numerals designate like constituent elements throughout the specification.

As described herein, "deformable plate" may include all types of plates that are capable of being deformed in response to a pressure increase. The shape of the plate is not limited to the described embodiments, rather any suitable plate shape may be used.

Figure 2:
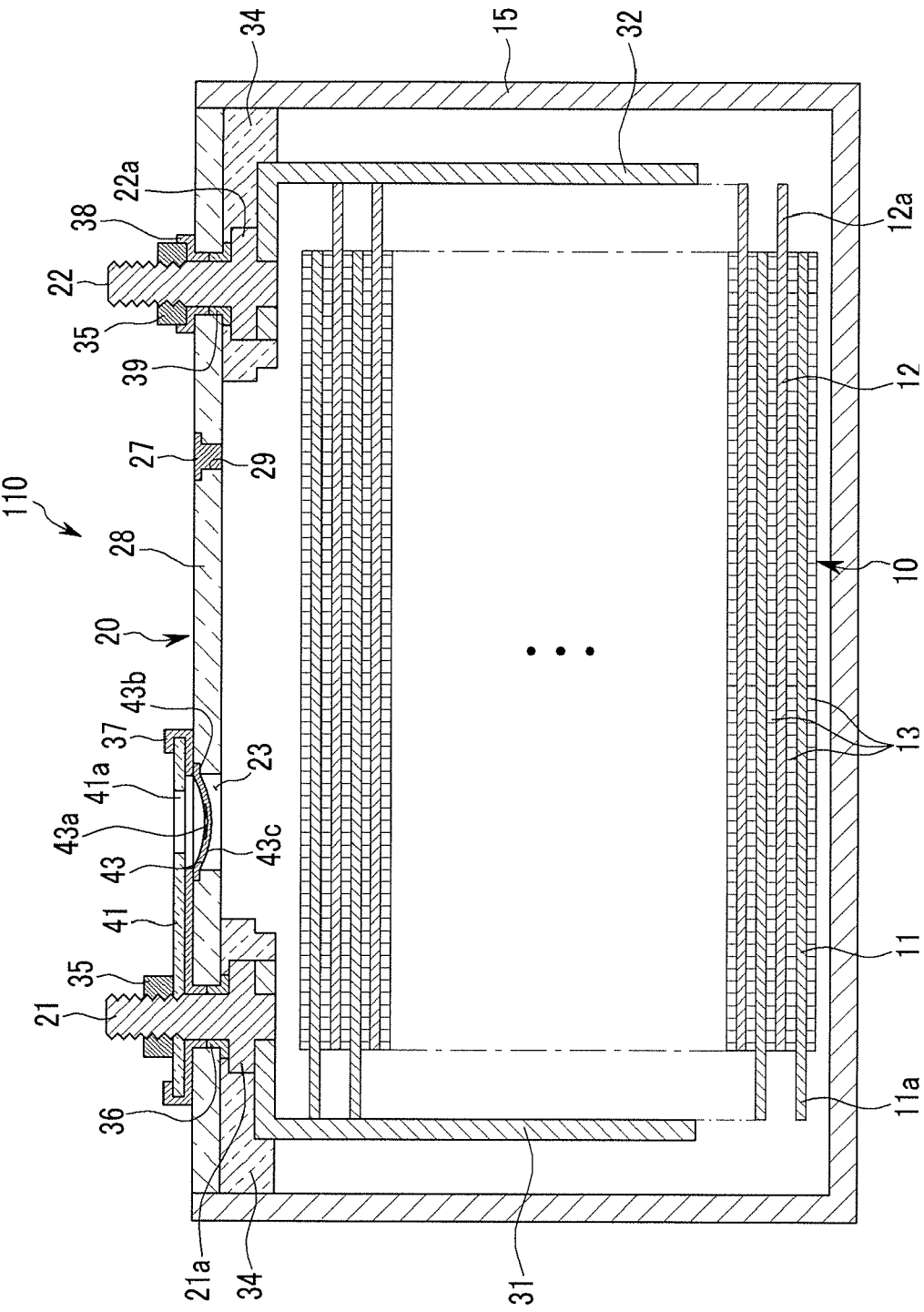
FIG. 2 is a cross-sectional view of FIG. 1, taken along the line II-II.

FIG. 1 is a perspective view of a rechargeable battery 110 according to a first exemplary embodiment of the present invention, and FIG. 2 is a cross-sectional view of FIG. 1, taken along the line II-II. Referring to FIG. 1 and FIG. 2, a rechargeable battery 110 according to the present exemplary embodiment includes an electrode assembly 10 that is wound with an insulating separator 13 disposed between a first electrode 11 and a second electrode 12, a case 15 in which the electrode assembly 10 is contained, and a cap assembly 20 coupled to an opening of the case 15.

The rechargeable battery 110 according to the first exemplary embodiment is a prismatic lithium ion secondary battery. However, the present invention is not limited thereto, and the present invention may be applied to various types of batteries such as a lithium polymer battery or a cylindrical lithium ion secondary battery.

The first electrode 11 and the second electrode 12 include coated regions and uncoated regions on a current collecting body that is formed of a thin plate metal foil. The coated regions are coated with an active material and the uncoated regions are not coated with the active material. In the present exemplary embodiment, the first electrode 11 is a positive electrode and the second electrode 12 is a negative electrode. However, the present invention is not limited thereto. Therefore, the first electrode 11 may be a negative electrode and the second electrode 12 may be a positive electrode.

A first electrode uncoated region 11a is formed at one side of the first electrode 11 along a length direction of the first electrode 11, and a second electrode uncoated region 12a is formed at one side of the second electrode 12 along a length direction of the second electrode 12. In addition, a separator 13, which is an insulator, is between the first electrode 11 and the second electrode 12. The first electrode 11, second electrode 12, and separator 13, are then spirally wound.

Alternatively, the electrode assembly 10 may have a structure in which the first and second electrodes 11 and 12, formed of a plurality of sheets, are alternately stacked, such as in a lithium polymer battery.

The case 15 is substantially formed as a cuboid, or a rectangular box, and an opening is formed on one side thereof. The cap assembly 20 includes a cap plate 28 covering the opening of the case 15, a first terminal 21 protruding out of the cap plate 28, the first terminal 21 electrically connected to the first electrode 11. The cap assembly 20 may also include a second terminal 22 electrically connected to the second electrode, a first tab 41 electrically connected to the first terminal 21, and a deformable plate 43 electrically connected to the second terminal 22 and contacting the first tab 41 when deformed.

The cap plate 28 is formed of a thin plate and combined to the opening of the case 15. The cap plate 28 includes a sealing cap 27 formed in an electrolyte injection opening 29.

The first terminal 21 and the second terminal 22 extend through the cap plate 28, and each of the first terminal 21 and second terminal 22 have flanges 21a and 22a that are supported under the cap plate 28. External circumferential surfaces of upper poles of the first and second terminals 21 and 22, protruding out of the cap plate 28, are threaded. In addition, nuts 35 that support the terminals 21 and 22 at upper portions thereof are fastened to respective terminals 21 and 22.

Gaskets 36 and 39 are respectively installed between the first terminal 21 and the cap plate 28 and between the second terminal 22 and the cap plate 28 so as to seal gaps between the terminals 21 and 22 and the cap plate 28.

The first terminal 21 is electrically connected to the first electrode 11 through a first lead tab 31, and the second terminal 22 is electrically connected to the second electrode 12 through a second lead tab 32.

As a lower insulation member 34 is below the cap plate 28, lower portions of the terminals 21 and 22 and upper portions of the lead tabs 31 and 32 are inserted into the lower insulation member 34.

With this structure, the first lead tab 31 electrically connects the first terminal 21 with the first electrode 11 and the second lead tab 32 electrically connects the second terminal 22 with the second electrode 12.

A short circuit opening 23 is formed in the cap plate 28, and the deformable plate 43 is inserted into the short circuit opening 23.

The first tab 41 (or short circuit tab) has a plate shape, and is located on the cap plate 28. The first terminal 21 is inserted into the first tab 41, and the first tab 41 is fixed to the first terminal 21 by the nut 35. Accordingly, the first tab 41 is electrically connected to the first terminal 21 through the nut 35.

As a conductive connection tab 38 is provided between the second terminal 22 and the nut 35, the connection tab 38 electrically connects the second terminal 22 and the cap plate 28. The second terminal 22 is inserted into a hole of the connection tab 38, and therefore the connection tab 38 is closely adhered to the cap plate 28 through the nut 35 provided thereon.

An upper insulation member 37 is provided between the first tab 41 and the cap plate 28 for insulation therebetween. The upper insulation member 37 partially surrounds the first terminal 21, and the edge of the upper insulation member 37 surrounds a side end of the first tab 41. Therefore, the first tab 41 is supported by the upper insulation member 37, and deformation due to pressure caused by deformation of the deformable plate 43 can be minimized or reduced. Accordingly, the first tab 41 and the deformable plate 43 can maintain a stable connection.

The deformable plate 43 (e.g., inversion plate) is inserted into the short circuit opening 23, and includes a notch 43a formed on a surface thereof, a frame portion 43b formed in a flat ring shape and attached to the cap plate 28 by welding, and a deformation portion 43c curved in an arc shape and protruded toward the electrode assembly 10. Accordingly, the deformable plate 43 is electrically connected to the second terminal 22 through the cap plate 28. The notch 43a is broken and emits gas outside when internal pressure of the case 15 is increased beyond a set or predetermined pressure. The notch 43a could be a thin portion. In other words, the notch 43a could be thinner than the rest of the deformable plate 43.

In the first tab 41, a round vent hole 41a is formed in a portion corresponding to the short circuit opening 23. In addition, a hole is formed in a portion of the upper insulation member 37 corresponding to the short circuit opening 23.

Figure 3A:
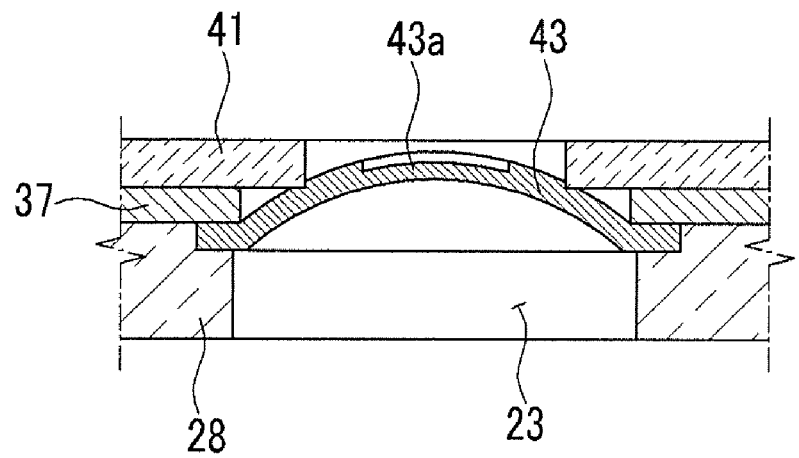
FIG. 3A is a cross-sectional view depicting a deformed deformable plate and a short tab according to the first exemplary embodiment of the present invention.

As shown in FIG. 3A, when the internal pressure of the rechargeable battery 110 is excessively increased, the deformation portion 43c that is originally protruded downward is deformed to protrude upward, and the first and second electrodes 11 and 12 are short circuited as the deformation portion 43a contacts the first tab 41.

The deformable plate 43 contacts the first tab 41 along an internal circumference of the vent hole 41a, and accordingly, a contact area of the deformable plate 43 and the first tab 41 is large enough to maintain a stable connection.

Figure 3B:
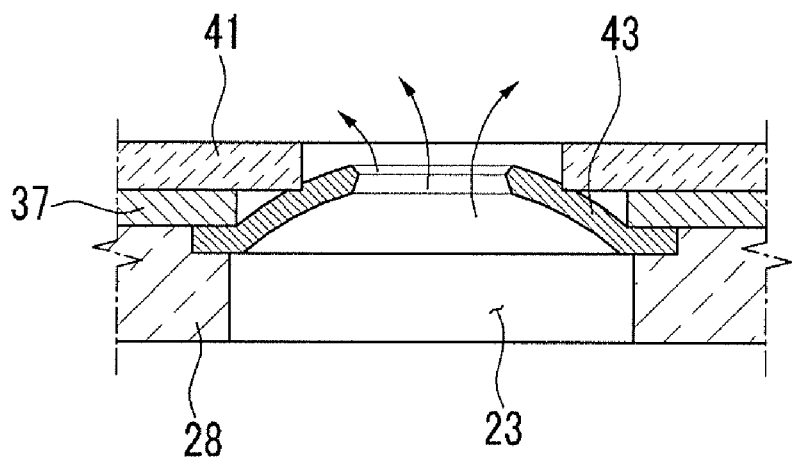
FIG. 3B is a cross-sectional view depicting a broken notch according to the first exemplary embodiment of the present invention.

In addition, as shown in FIG. 3B, when the internal pressure of the case 15 is further increased after the first and second electrodes 11 and 12 are disconnected, the notch 43a of the deformable plate 43 is broken and internal gas is discharged or emitted out of the battery. The gas may be emitted out through the vent hole 41a of the first tab 41.

As described, according to the first exemplary embodiment, when the temperature is increased or the internal pressure of the rechargeable battery 110 is excessively increased due to dissolution of the electrolyte solution, or any other reason, the deformation portion 43c induces a short circuit to thereby prevent or minimize the risk of explosion or combustion of the rechargeable battery 110. The pressure that causes deformation of the deformable plate 43 can be accurately controlled by changing the thickness and shape of the deformable plate 43.

Particularly, the location where the deformable plate 43 and the first tab 41 contact one another is separated from the electrolyte solution, so that combustion of the electrolyte solution due to flame or heat generated when the short circuit occurs can be prevented. When the short circuit occurs, the current is quickly (e.g., instantaneously) increased so that the internal temperature of the battery may be greatly increased. However, as in the present exemplary embodiment, heat can be emitted out of the case 15, through the first tab 41, which is outside the case 15, so that the accumulation of excessive heat inside the case 15 can be prevented.

An elastic member, such as a spring, continuously receives pressure during normal operation of a battery, and the elasticity of the spring may be decreased or eliminated after a period of time. However, in order to improve long term safety of the rechargeable battery 110, the elastic member should be capable of operating under a predetermined or set pressure without losing elasticity during an expected life of the rechargeable battery. If the elastic member receives pressure during normal operation of the battery, the elasticity of the elastic member is reduced or eliminated, and thus it may not properly operate during the expected life of the rechargeable battery 110, thereby causing a safety problem. Therefore, when the deformable plate 43 is used according to the present exemplary embodiment, the elastic member, i.e., the deformable plate 43, is capable of operating without being deformed under a predetermined or set pressure during normal operation, so that it may operate under the predetermined pressure for a relatively long period of time.

In addition, when the internal pressure of the case 15 is further increased, the notch 43a is broken so that explosion of the rechargeable battery 110 can be prevented. An additional vent member is not required since the deformable plate 43 functions as a vent.

Figure 4:
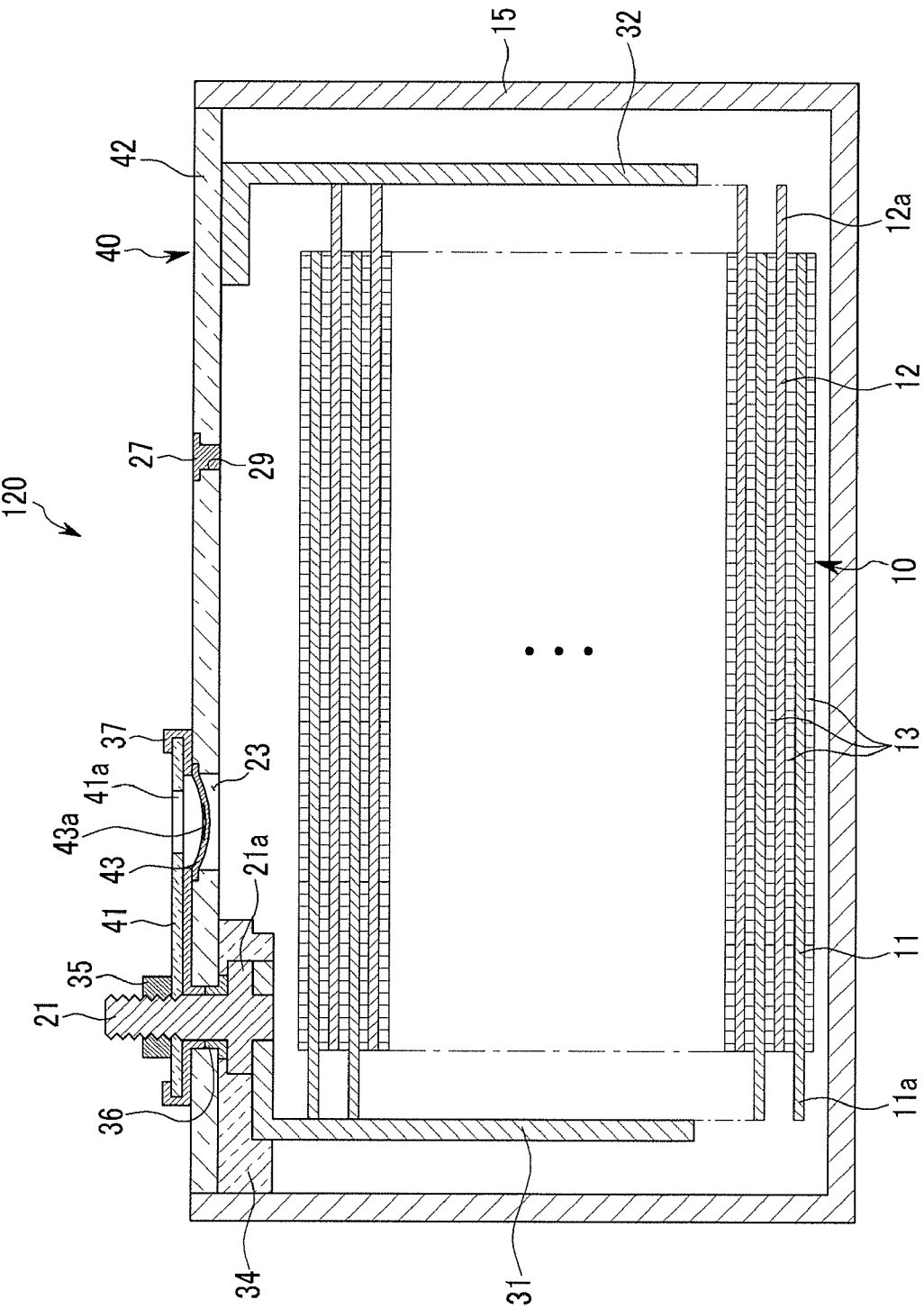
FIG. 4 is a cross-sectional view of a rechargeable battery according to a second exemplary embodiment of the present invention.

FIG. 4 is a cross-sectional view of a rechargeable battery according to a second exemplary embodiment of the present invention.

Referring to FIG. 4, a rechargeable battery 120 according to the second exemplary embodiment generally has the same structure as the rechargeable battery of the first exemplary embodiment, except that the rechargeable battery 120 does not include a second terminal. No further description of structures that are similar will be provided.

As shown in FIG. 4, the rechargeable battery 120 according to the present exemplary embodiment includes a case 15 and a cap assembly 40 that closes and seals the case 15.

The cap assembly 40 includes a first terminal 21 protruding out of the case 15, a cap plate 42 combined to an opening of the case 15, and a first tab 41 electrically connected to the first terminal 21 and provided on the cap plate 42.

The first terminal 21 extends through the cap plate 42 and protrudes out of the case 15, and is electrically connected to the first electrode 11 through a first lead tab 31.

The rechargeable battery 120 also includes a second electrode 12 and a second lead tab 32 electrically connecting the second electrode 12 and the cap plate 42. A lower portion of the second lead tab 32 is attached to a second uncoated region 12a of the second electrode 12 by welding, and an upper portion of the second lead tab 32 is attached to the cap plate 42 by welding.

A short circuit opening 23 is formed in the cap plate 42. A deformable plate 43 is provided in the short circuit opening 23 and is deformed when the internal temperature of the case 15 is increased and induces a short circuit between the cap plate 42 and the first tab 41. The deformable plate 43 may include a notch 43a, e.g., a thin portion.

A first tab 41, electrically connected to the first terminal 21, and including vent hole 41a, is formed above the short circuit opening 23. Thus, when the deformable plate 43 is deformed so that it contacts the first tab 41, the first and second electrodes 11 and 12 are electrically connected so that a short circuit may occur therebetween.

According to the present exemplary embodiment, the second lead tab 32 is directly attached to the cap plate 42 so that contact resistance between the second terminal 12 and the cap plate 42 can be minimized or reduced.

Figure 5:
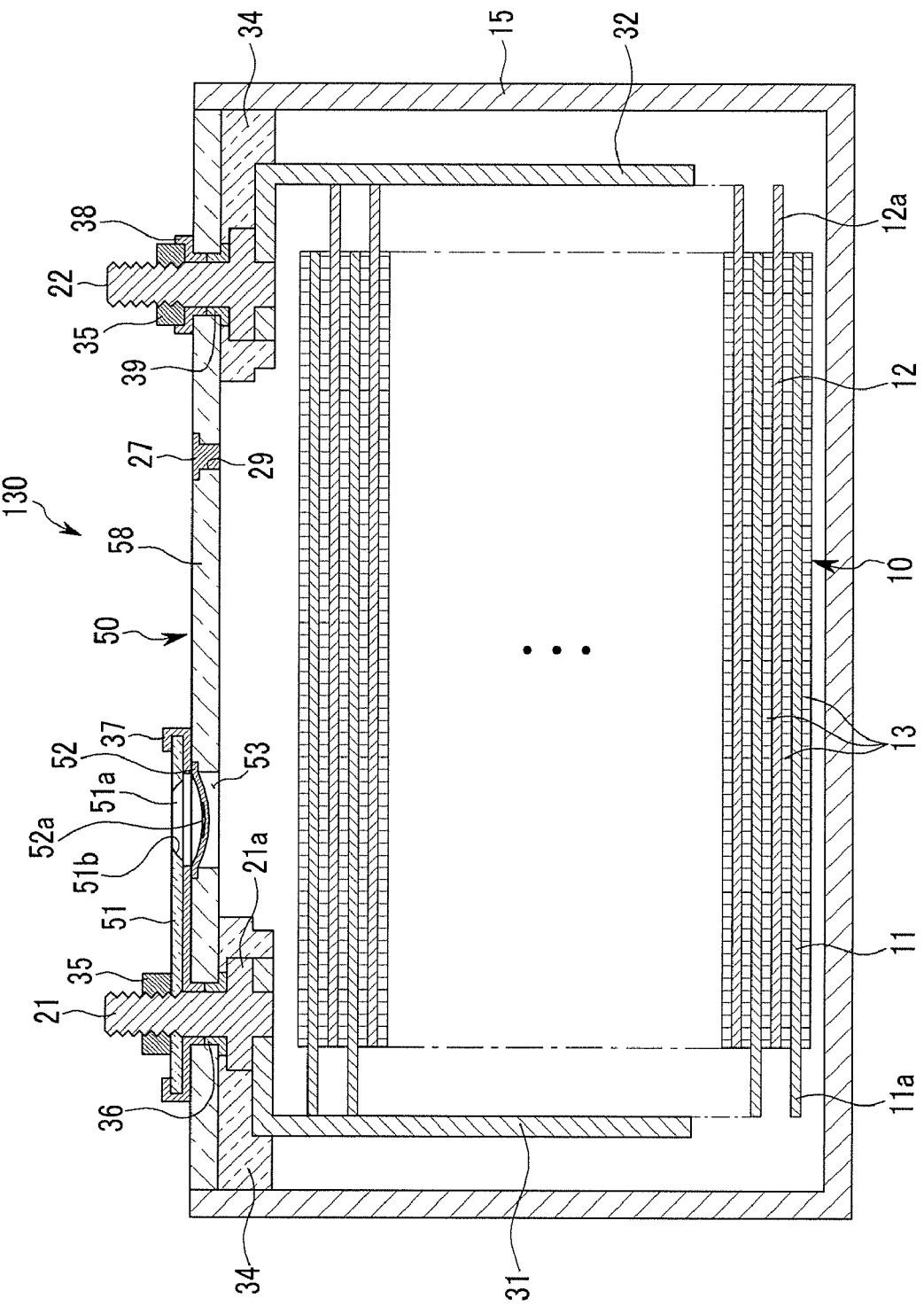
FIG. 5 is a cross-sectional view of a rechargeable battery according to a third exemplary embodiment of the present invention.

FIG. 5 is a cross-sectional view of a rechargeable battery according to a third exemplary embodiment of the present invention.

Referring to FIG. 5, a rechargeable battery 130 according to the third exemplary embodiment has a structure that is generally the same as the rechargeable battery of the first exemplary embodiment, except for the structure of the first tab, and therefore structures that are similar may not be further described.

As shown in FIG. 5, the rechargeable battery 130 according to the present exemplary embodiment includes a case 15 and a cap assembly 50 that closes and seals the case 15.

The cap assembly 50 includes a first terminal 21 protruding out of the case, a cap plate 58 combined to an opening of the case 15, and a first tab 51 electrically connected to the first terminal 21 and provided on the cap plate 58.

The first terminal 21 and the second terminal 22 extend through the cap plate 58 and protrude out of the case.

A deformable plate 52 that deforms when internal pressure of the case 15 is increased is inserted into a short circuit opening 53 formed in the cap plate 58. The deformable plate 53 induces a short circuit between the cap plate 58 and the first tab 51. A notch 52a is formed in the deformable plate 53.

The first tab 51 has a vent hole 51a. In this case, a vertical cross-section of an internal surface 51b of the vent hole 51a is curved in an arc shape so that the interior diameter of the vent hole 51a is gradually decreased upward. In other words, a diameter of the vent hole 51a decreases from an interior of the case toward the exterior of the case.

Figure 6A:
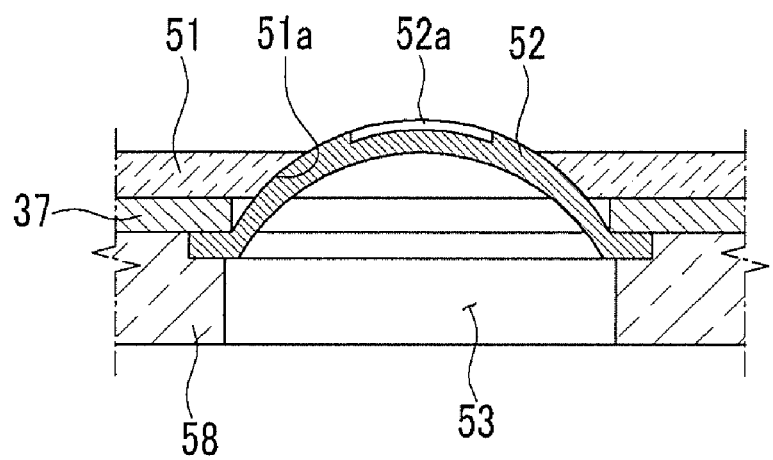
FIG. 6A is a cross-sectional view depicting a deformed deformable plate and a first tab according to the third exemplary embodiment of the present invention.

As shown in FIG. 6A, when internal pressure of the rechargeable battery 130 is increased, the deformable plate 52 is deformed upwardly so that it electrically contacts the first tab 51. In this case, the first tab 51 contacts the deformable plate 52 at the internal surface of the vent hole 51a, and the internal surface 51b of the vent hole 51a is curved in the arc shape so that the curved deformable plate 52 and the first tab 51 may have a large contact area.

Figure 6B:
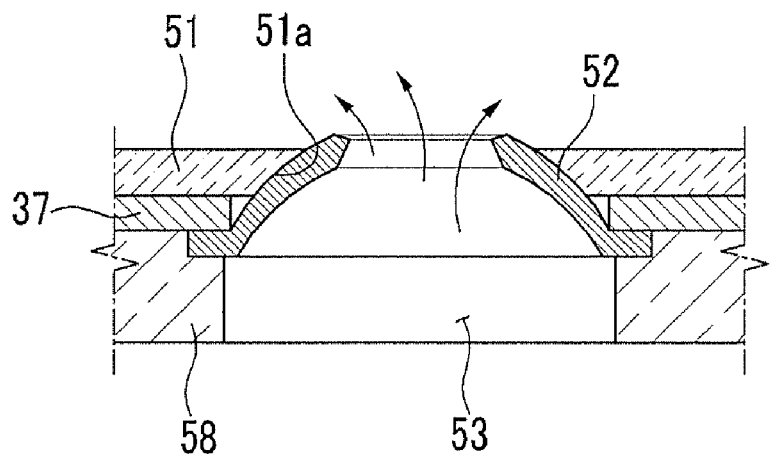
FIG. 6B is a cross-sectional view depicting a broken notch according to the third exemplary embodiment of the present invention.

As shown in FIG. 6B, when the internal pressure of the case 15 is further increased, the notch 52a of the deformable plate 52 is broken and internal gas may be emitted out of the rechargeable battery 130 therethrough.

Figure 7:
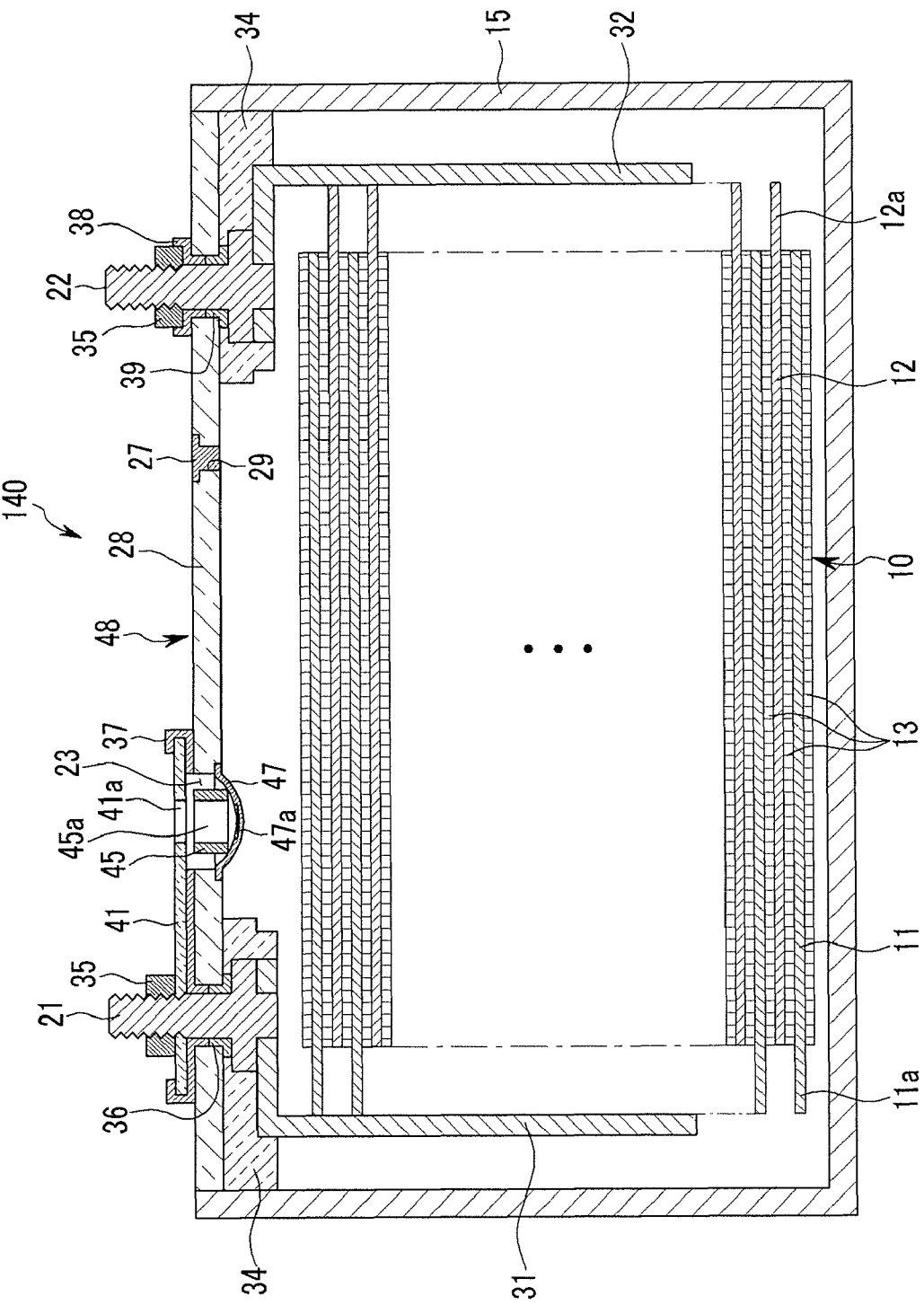
FIG. 7 is a cross-sectional view of a rechargeable battery according to a fourth exemplary embodiment of the present invention.

FIG. 7 is a cross-sectional view of a rechargeable battery according to a fourth exemplary embodiment of the present invention.

Referring to FIG. 7, a rechargeable battery 140 according to the present exemplary embodiment generally has the same structure as the rechargeable battery of the first exemplary embodiment, except that a middle member 45 is added to the rechargeable battery 140. No further description for similar structures will be provided.

The rechargeable battery 140 according to the present exemplary embodiment includes a case 15 and a cap assembly 48 that closes and seals the case 15.

The cap assembly 48 includes a cap plate 28, a first terminal 21, a second terminal 22, a first tab 41 provided on the cap plate 28, a deformable plate 47 disposed under a short circuit hole 23 of the cap plate 28, and a middle member 45 provided between the first tab 41 and the deformable plate 47.

The first tab 41 is electrically connected to the first terminal 21, and the cap plate 28 is electrically connected to the second terminal 22. In addition, the deformable plate 47 is welded to the cap plate 28 under the short circuit opening 23 and is thus electrically connected to the cap plate 28.

The middle member 45 is thicker than the deformable plate 47, and is disposed between the first tab 41 and the deformable plate 47. In addition, the middle member 45 is formed in a cylindrical pipe shape, and has an internal space. When the middle member 45 is welded to the deformable plate, the middle member 45 is welded along a lower end circumference of the middle member 45. In addition, an upper surface of the middle member 45 is parallel to the first tab 41 so that the middle member 45 can have sufficient contact area with the first tab 41.

The middle member 45 can be inversely deformed at a set or predetermined pressure level by controlling the weight, thickness, and shape thereof.

Thus, when the deformable plate 47 is deformed to be convex upward, the middle member 45 is lifted and contacts the first tab 41, and accordingly, the cap plate 28 is electrically connected to the first tab 41 through the deformable plate 47 and the middle member 45.

A notch 47a is formed in the deformable plate 47, and a middle hole 45a is in the center of the middle member 45, in the internal space. When internal pressure of the case 15 is further increased, the notch 47a is broken and opened, and internal gas is emitted through the middle hole 45a and a vent hole 41a.

When the deformable plate 47 directly contacts the first tab 41, the deformable plate 47 may be melted due to an over current, and thus the short circuit may be stopped. This is because the deformable plate 47 may not sufficiently contact, but rather may only partially contact, the first tab 41.

However, according to the present exemplary embodiment, the middle member 45 can contact the first tab 41 in a sufficient area. As the middle member 45 is welded to the deformable plate 47, and the middle member 45 has sufficient contact area with the first tab 41, the short circuit can be continued.

Figure 8:
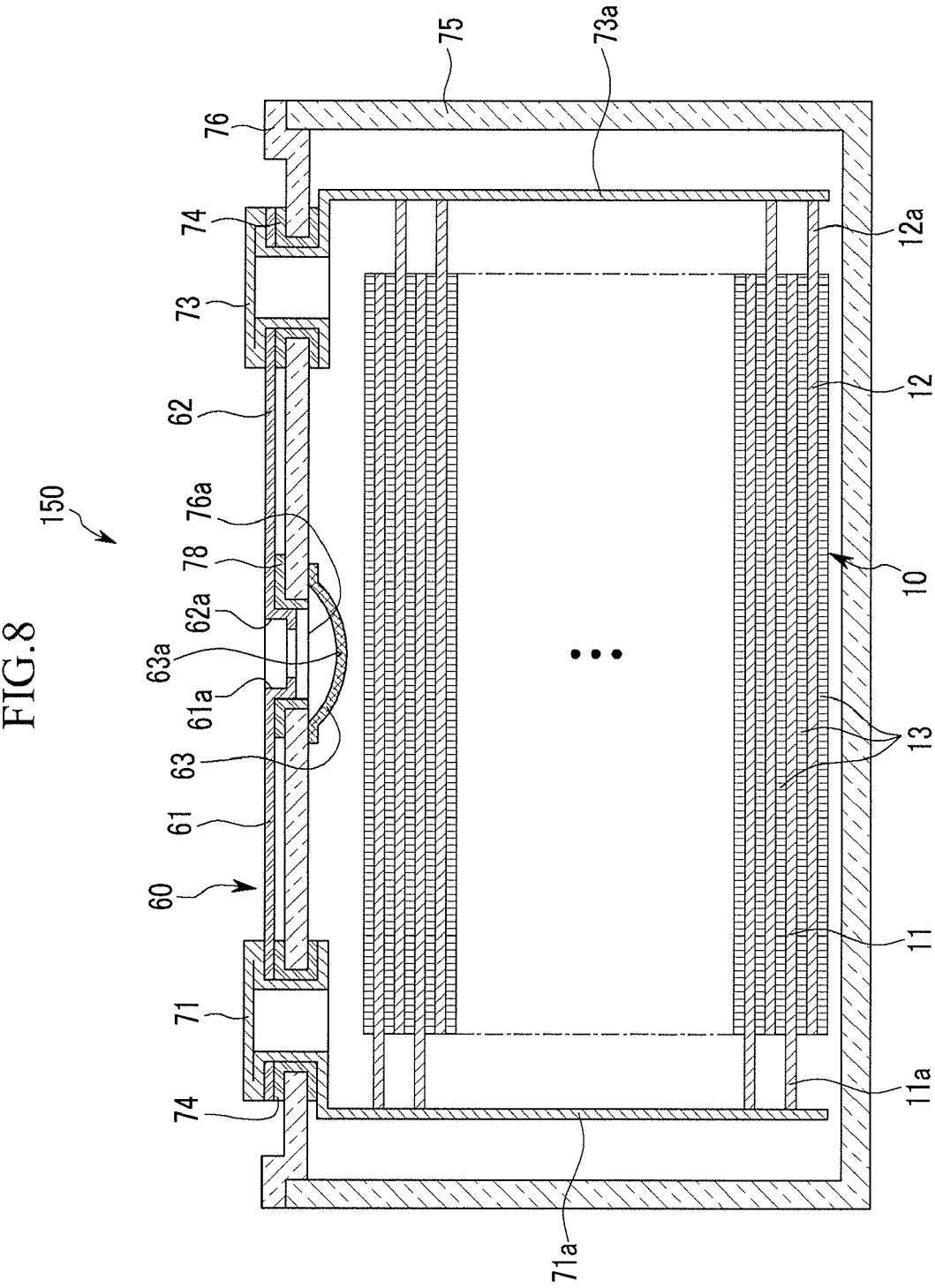
FIG. 8 is a cross-sectional view of a rechargeable battery according to a fifth exemplary embodiment of the present invention.
Figure 9:
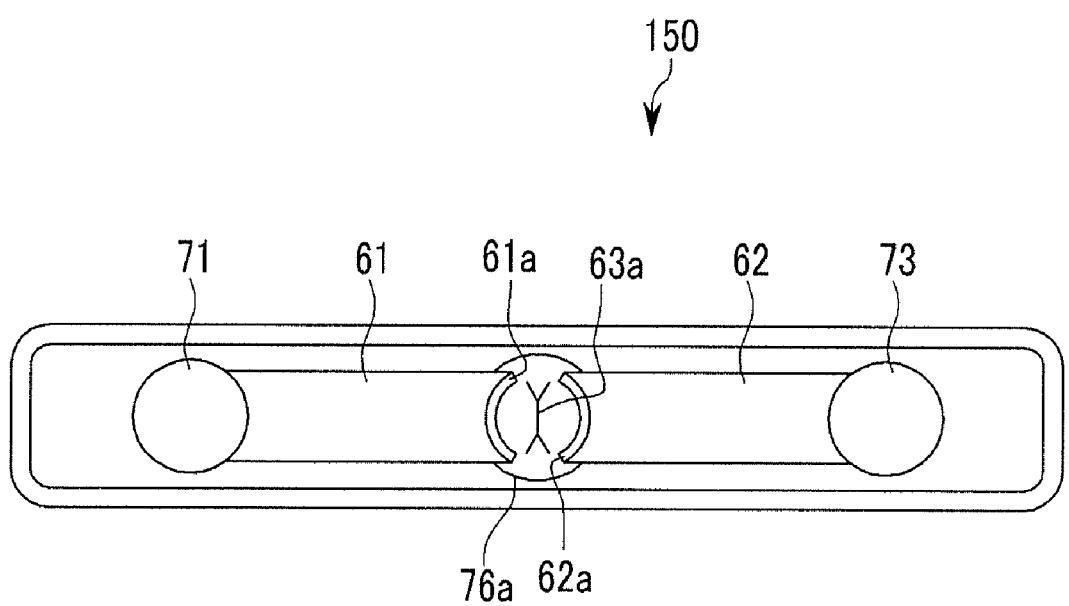
FIG. 9 is a top view of the rechargeable battery according to the fifth exemplary embodiment of the present invention.

FIG. 8 is a cross-sectional view of a rechargeable battery according to a fifth exemplary embodiment of the present invention, and FIG. 9 is a top view of the rechargeable battery according to the fifth exemplary embodiment of the present invention.

Referring to FIG. 8 and FIG. 9, a rechargeable battery 150 according to a fifth exemplary embodiment includes an electrode assembly 10, a case 75 to which the electrode assembly 10 is inserted, and a cap assembly 60 closing and sealing the case 75. The electrode assembly 10 includes a first electrode 11, a second electrode 12, and a separator 13 interposed between the first and second electrodes 11 and 12. The cap assembly 60 includes a cap plate 76 combined to an opening of the case 75, a first terminal 71 electrically connected to the first electrode 11, and a second terminal 73 electrically connected to the second electrode 12.

The cap plate 76 is formed of a thin plate, and has a short circuit opening 76a in a center thereof.

In addition, a first tab 61 electrically connected to the first terminal is provided at the first terminal 71, and the first tab 61 has a protrusion 61a inserted into the short circuit opening 76a. A second tab 62 is provided at the second terminal 73, and the second tab 62 has a protrusion 62a inserted into the short circuit opening 76a.

In the present exemplary embodiment, the first terminal 71 and the second terminal 73 are formed in a rivet shape.

The first terminal 71 is electrically connected to a first electrode uncoated region 11a through a first lead tab 71a, and the second terminal 73 is electrically connected to a second electrode uncoated region 12a through a second lead tab 73a. Gaskets 74 are provided between the terminals 71 and 73 and the cap plate 76 for sealing and insulation.

The first tab 61 (e.g., first short circuit tab) and the second tab 62 (e.g., second short circuit tab) are inserted into the short circuit opening 76a on the cap plate 76 through an insulation member 78 and thus they are electrically insulated from the cap plate 76, and accordingly the cap plate 76 and the case 75 do not have electrical polarity.

The first terminal 71 and the second terminal 73 are located on respective edges of the cap plate 61 along the longitudinal direction. One end of the first tab 61 is inserted into the first terminal 71, and the other end thereof having the protrusion 61a is inserted into the short circuit opening 76a. One end of the second tab 62 is inserted into the second terminal 73, and the other end thereof having the protrusion 62a is inserted into the short circuit opening 76a.

In the short circuit opening 76a, the first tab 61 and the second tab 62 are disposed at a distance from each other, and the ends of the protrusions 61a and 62a are substantially formed in an arc shape. A deformable plate 63 is provided below the short circuit opening 76a, and a notch 63a is formed in the deformable plate 63.

When internal pressure of the rechargeable battery 150 is increased, the deformable plate 63 is deformed and lifted upward so that the first and second tabs 61 and 62 are electrically connected. When the internal pressure of the rechargeable battery 150 is further increased while the battery is short circuited, the notch 63a is broken and internal gas is emitted out of the rechargeable battery 150 therethrough.

As described, according to the present exemplary embodiment, when pressure in the battery is increased, the first and second tabs 61 and 62 are electrically connected to thereby prevent explosion of the battery due to an excessive increase of internal pressure. The first and second tabs 61 and 62 are located outside the case 75 so that excessive internal heat generation in the rechargeable battery 150 due to a short circuit current is prevented or reduced.

In addition, a current does not flow through the cap plate 76 so that overheating of the cap plate 76 can be prevented or reduced. Further, since the first and second tabs 61 and 62 are located outside the case 75, heat can be easily emitted out through the first and second tabs 61 and 62. Furthermore, as the first and second tabs 61 and 62 are separated from the electrolyte solution in the battery, combustion of the electrolyte solution can be prevented.

While this disclosure has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising:
   an electrode assembly comprising a first electrode, a second electrode, and a separator between the first electrode and the second electrode;
   a case containing the electrode assembly; and
   a cap assembly coupled to the case, the cap assembly comprising a cap plate, the cap plate having a short circuit opening, a first tab electrically coupled to the first electrode, the first tab being at an exterior of the case, and a deformable plate covering the short circuit opening, the deformable plate comprising a first portion and a second portion that is thinner than the first portion, the deformable plate being configured to form an electrical path between the first electrode and the second electrode by directly or indirectly contacting, the first tab when deformed.

2. The rechargeable battery of claim 1, wherein the cap assembly further comprises a first terminal electrically coupled to the first electrode and mounted on the cap plate, wherein the first tab is electrically connected to the first terminal.

3. The rechargeable battery of claim 2, wherein the first tab has an opening through which the first terminal protrudes from an interior to an exterior of the case.

4. The rechargeable battery of claim 1, wherein the cap assembly further comprises an insulating member between the first tab and the cap plate for electrically insulating the first tab from the cap plate, wherein the insulating member includes an opening to accommodate upward deformation of the deformable plate.

5. The rechargeable battery of claim 1, wherein the first tab comprises a protrusion which is at least partially inserted into the short circuit opening.

6. The rechargeable battery of claim 1, wherein the second electrode is electrically coupled to the cap plate.

7. The rechargeable battery of claim 1, wherein the deformable plate is curved to protrude toward an inside of the case.

8. The rechargeable battery of claim 1, wherein the deformable plate is configured to break and open at the second portion in response to an increase in pressure inside the case.

9. The rechargeable battery of claim 1, wherein the first tab has a vent hole.

10. The rechargeable battery of claim 9, wherein a diameter of the vent hole decreases from the interior of the case toward the exterior of the case.

11. The rechargeable battery of claim 1, further comprising a middle member between the first tab and the deformable plate and attached to the deformable plate.

12. The rechargeable battery of claim 1, further comprising a first terminal, a second terminal, and a second tab, the first tab being connected to the first terminal and the second tab being connected to the second terminal, the deformable plate being configured to deform and electrically contact the first tab and the second tab in response to an increase in pressure inside the case.

13. The rechargeable battery of claim 1, wherein the second portion is at the center of the deformable plate.

14. The rechargeable battery of claim 1, wherein the second portion comprises a notch.

15. A rechargeable battery comprising:
an electrode assembly comprising a first electrode, a second electrode, and a separator between the first electrode and the second electrode;
a case containing the electrode assembly; and
a cap assembly coupled to the case, the cap assembly comprising a cap plate, the cap plate having a short circuit opening, a first tab electrically coupled to the first electrode, the first tab being external to the case, and a deformable plate covering the short circuit opening, the deformable plate being configured to deform and break to allow gas to exit the case, the deformable plate being configured to form an electrical path between the first electrode and the second electrode by directly or indirectly contacting, the first tab when deformed.

16. The rechargeable battery of claim 15, wherein the cap plate has a vent hole configured to allow gas to exit the case when the deformable plate breaks.

17. A rechargeable battery comprising:
an electrode assembly comprising a first electrode, a second electrode, and a separator between the first electrode and the second electrode;
a case containing the electrode assembly; and
a cap assembly coupled to the case, the cap assembly comprising a cap plate, a first terminal, a second terminal, a first tab electrically coupled to the first electrode and connected to the first terminal, a second tab connected to the second terminal, and a deformable plate comprising a first portion and a second portion that is thinner than the first portion, the deformable plate being configured to deform and electrically contact the first tab and the second tab in response to an increase in pressure inside the case,
wherein the cap plate has a short circuit opening, and wherein a first end of the first tab is connected to the first terminal and a second end of the first tab is in the short circuit opening and a first end of the second tab is connected to the second terminal and a second end of the second tab is in the short circuit opening.

* * * * *